(12) United States Patent
Popescu et al.

(10) Patent No.: US 8,730,837 B2
(45) Date of Patent: May 20, 2014

(54) SYSTEM AND METHOD FOR CONTROL OF POWER DISTRIBUTION NETWORKS

(75) Inventors: Bogdan Cristian Popescu, Calgary (CA); Willem Hendrik du Toit, Cochrane (CA)

(73) Assignee: General Electric Company, Schenectady, NY (US)

( * ) Notice: Subject to any disclaimer, the term of this patent is extended or adjusted under 35 U.S.C. 154(b) by 679 days.

(21) Appl. No.: 12/819,515

(22) Filed: Jun. 21, 2010

(65) Prior Publication Data

US 2011/0313586 A1    Dec. 22, 2011

(51) Int. Cl.
*H04L 12/28* (2006.01)
*G01R 31/08* (2006.01)

(52) U.S. Cl.
USPC .......................................... 370/254; 370/216

(58) Field of Classification Search
CPC ......... H01L 41/12; Y04S 10/00; Y04S 20/00; Y04S 10/30; H04L 41/0853; H04L 41/0813; H04L 12/28; G01R 31/08
USPC .......... 700/292, 286, 295; 709/220–222, 223, 709/224, 203, 208, 209; 370/216, 218, 219, 370/241, 242, 244, 245, 247, 251, 254, 255, 370/258, 329, 338, 384, 385, 386, 390; 702/60, 58, 59, 62, 64, 182–183, 185; 703/18; 361/62, 64, 66, 115
See application file for complete search history.

(56) References Cited

U.S. PATENT DOCUMENTS

| 3,909,677 A | 9/1975 | McClain |
| 4,302,750 A | 11/1981 | Wadhwani et al. |
| 4,322,842 A | 3/1982 | Martinez |
| 5,237,511 A | 8/1993 | Caird et al. |
| 5,438,509 A | 8/1995 | Heffron |
| 5,701,226 A | 12/1997 | Gelbien |
| 5,732,193 A | 3/1998 | Aberson |

(Continued)

FOREIGN PATENT DOCUMENTS

| EP | 0721690 A1 | 7/1996 |
| EP | 0875023 A1 | 11/1998 |

(Continued)

OTHER PUBLICATIONS

English Abstract for EP0992867A1; Publication Date: Apr. 12, 2000.

(Continued)

*Primary Examiner* — Hanh N Nguyen
(74) *Attorney, Agent, or Firm* — Cantor Colburn LLP

(57) ABSTRACT

A system for controlling a multi-feed power distribution network includes: a first controller configured to control operation of a first network sector, the first controller configured to, in response to a topology change in the first network sector causing a change in a location from which power is supplied to at least one affected network segment, transmit a message identifying the at least one affected network segment from the first controller to the network without prior knowledge of any other controllers; and at least one second controller configured to control operation of the at least one second network sector, the second controller configured to receive the message, exchange configuration information regarding the at least one affected segment with the first controller, and automatically update the second configuration data of the second controller based on the configuration information received from the first controller to reflect the topology change.

20 Claims, 3 Drawing Sheets

(56) References Cited

U.S. PATENT DOCUMENTS

| | | |
|---|---|---|
| 5,734,255 A | 3/1998 | Thompson et al. |
| 5,734,586 A | 3/1998 | Chiang et al. |
| 5,784,237 A | 7/1998 | Velez |
| 5,812,389 A | 9/1998 | Katayama et al. |
| 5,896,302 A | 4/1999 | Goodpaster |
| 5,973,899 A | 10/1999 | Williams et al. |
| 6,005,759 A | 12/1999 | Hart et al. |
| 6,018,449 A | 1/2000 | Nelson et al. |
| 6,243,244 B1 | 6/2001 | Nelson et al. |
| 6,259,972 B1 | 7/2001 | Sumic et al. |
| 6,347,027 B1 | 2/2002 | Nelson et al. |
| 6,504,693 B1 | 1/2003 | Moffat et al. |
| 6,529,857 B1 | 3/2003 | O Donnell et al. |
| 6,535,797 B1 | 3/2003 | Bowles et al. |
| 6,539,287 B1 | 3/2003 | Ashizawa |
| 6,564,242 B1 | 5/2003 | Bonet et al. |
| 6,907,321 B2 | 6/2005 | Kearney et al. |
| 7,359,957 B2 | 4/2008 | Dinges et al. |
| 7,554,459 B2 * | 6/2009 | Giubbini .................. 340/870.02 |
| 7,751,166 B2 | 7/2010 | Stoupis et al. |
| 7,852,207 B2 * | 12/2010 | Berkman et al. ......... 340/538.16 |
| 7,936,685 B2 * | 5/2011 | Kucharczyk .................. 370/250 |
| 7,937,167 B1 * | 5/2011 | Mesarina et al. ............... 700/78 |
| 8,000,913 B2 * | 8/2011 | Kreiss et al. .................... 702/60 |
| 2003/0185150 A1 | 10/2003 | Matsumoto et al. |
| 2004/0153215 A1 | 8/2004 | Kearney et al. |
| 2004/0158417 A1 | 8/2004 | Bonet |
| 2005/0251296 A1 | 11/2005 | Nelson et al. |
| 2006/0195229 A1 | 8/2006 | Bell et al. |
| 2007/0192332 A1 | 8/2007 | Deuter et al. |
| 2008/0100975 A1 | 5/2008 | Myoung et al. |
| 2008/0103631 A1 | 5/2008 | Koliwad et al. |
| 2008/0211511 A1 | 9/2008 | Choi et al. |
| 2008/0215797 A1 | 9/2008 | Dinges et al. |
| 2008/0231114 A1 | 9/2008 | Tolnar et al. |
| 2008/0255709 A1 | 10/2008 | Balgard et al. |
| 2009/0034419 A1 * | 2/2009 | Flammer et al. ............... 370/238 |
| 2009/0112375 A1 * | 4/2009 | Popescu ........................ 700/292 |
| 2009/0138104 A1 | 5/2009 | Huck |
| 2011/0035067 A1 | 2/2011 | Larsson et al. |
| 2011/0313586 A1 | 12/2011 | Popescu et al. |
| 2013/0054042 A1 | 2/2013 | du Toit et al. |
| 2013/0066444 A1 | 3/2013 | Popescu et al. |

FOREIGN PATENT DOCUMENTS

| | | |
|---|---|---|
| EP | 0875023 B1 | 9/1999 |
| EP | 0968589 A1 | 1/2000 |
| EP | 0992867 A1 | 4/2000 |
| EP | 1020000 A1 | 7/2000 |
| EP | 1020000 B1 | 2/2003 |
| EP | 1443624 A1 | 8/2004 |
| EP | 0992867 B1 | 8/2005 |
| EP | 1983812 A1 | 10/2008 |
| JP | 2241333 A | 9/1990 |
| JP | 5219664 A | 8/1993 |
| JP | 6189454 A | 7/1994 |
| JP | 8228432 A | 9/1996 |
| JP | 946894 A | 2/1997 |
| JP | 2006174686 | 6/2006 |
| JP | 2007116893 A | 5/2007 |
| WO | 95/09473 | 4/1995 |
| WO | 97/26587 A1 | 7/1997 |
| WO | 98/42103 A1 | 9/1998 |
| WO | 99/19960 A1 | 4/1999 |

OTHER PUBLICATIONS

English Abstract for EP0992867B1; Publication Date: Aug. 31, 2005.

English translation of Chinese Office Action for CN Application No. 200810173121.0, dated Jun. 1, 2012, pp. 1-10.

English Translation of Chinese Office Action for CN Application No. 200810173121.0, dated Jun. 5, 2013, pp. 1-15.

English Translation of Chinese Office Action for CN Application No. 200810173121.0, dated Dec. 6, 2012, pp. 1-6.

Fan et al, "Feeder Automation within the Scope of Substation Automation", 2006, IEEE, pp. 607-612.

Hor et al. "Substation event analysis using information from intelligent electronic devices". Electrical Power and Energy Systems 28 (2006) 374-386.

S&C Electric Company, IntelliTEAM II Exceeds Reliability Goals, Apr. 2005, pp. 2.

Japanese Office Action for JP Application No. 2008-275128, dated Mar. 5, 2013, pp. 1-8.

S&C Electric Company, S&C IntelliTeam II Automatic Restoration System, Jun. 2005, pp. 4.

Staszesky et al., "Advanced feeder Automation is here", IEEE, 2005, pp. 56-63.

Watson, "Benefits of Distribution Automation and Performance Results from a Network Trial", IEEE, 1997, pp. 251-255.

Webopedia.com, "Definition of: Polling", downloaded Jul. 3, 2013, 1 page.

\* cited by examiner

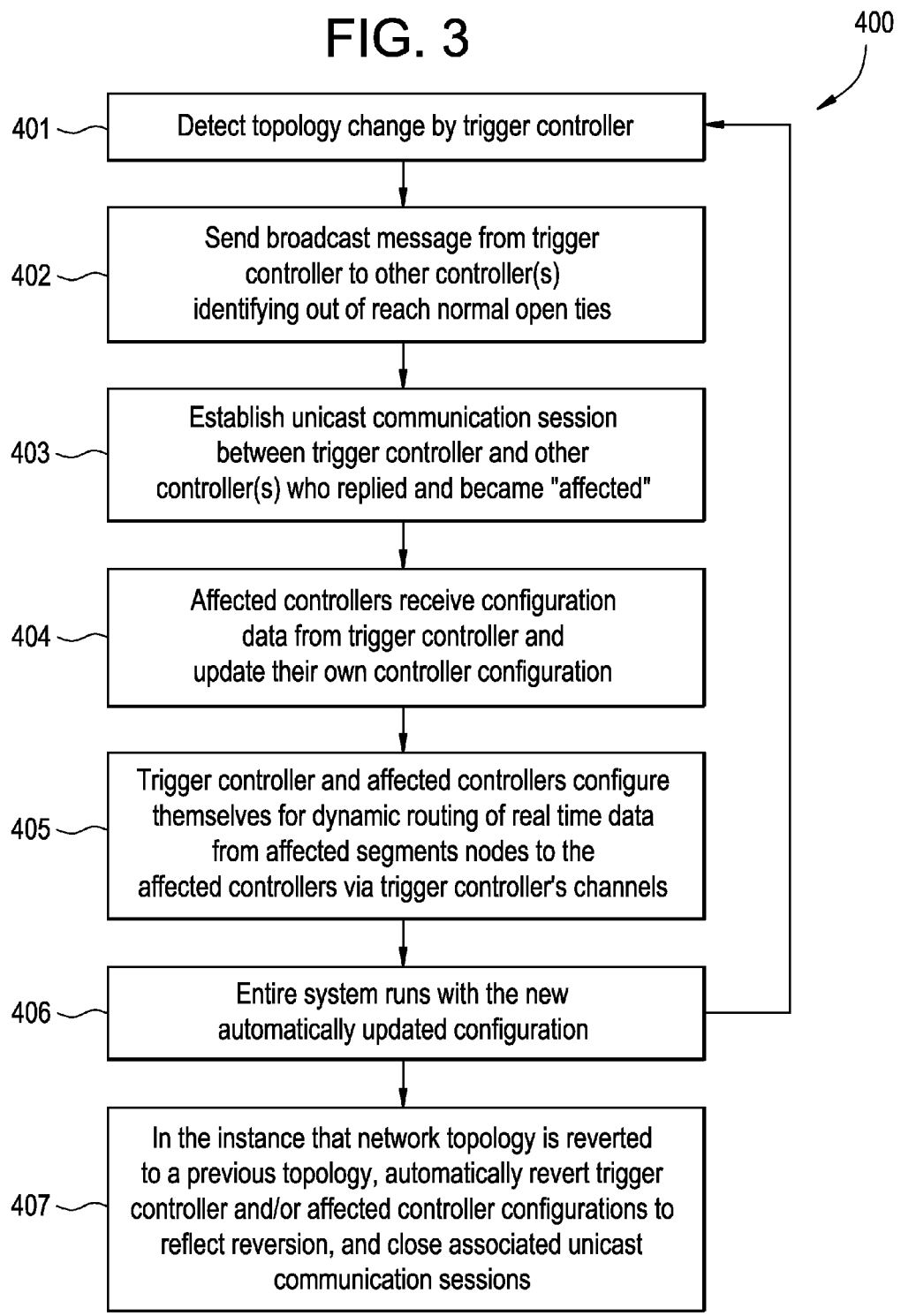

SYSTEM AND METHOD FOR CONTROL OF POWER DISTRIBUTION NETWORKS

BACKGROUND OF THE INVENTION

The subject matter disclosed herein relates to systems and applications for controlling power distribution networks with multiple feeds from one or more substations.

Electrical power distribution networks (i.e., grids) generally consist of multiple segments tied together via switches and other field devices, and are generally fed from one or more sources. Such networks may use active devices which can sense conditions in power circuits formed in the networks and can distinguish between the various segments (e.g. controlled switches, reclosers, etc.). Many control systems for more complex grids, such as mesh-like grids, require centralized distribution management systems (DMS) or central controllers that control operation of all substations. Such centralized solutions require dedicated resources for deployment and maintenance, such as specific equipment and human skill sets.

Alternatively, control systems may utilize entirely distributed logic controllers for complex grids, with all such controllers located directly at the sectionalizing points of the power grid ("in field"). However, such distributed logic control systems generally require the use of the same type of control devices, often from the same supplier, across the entire distribution power grid. Such "peer to peer 'intelligent'" solutions for field devices, which may be defined as neighbor to neighbor communications exclusively among such in field controllers, generally do not require dedicated controllers in substations, but rely on some sort of identical "smart" device being deployed at every field location, and quite often rely on specific communications protocols and mediums for field devices. In addition, the inclusion of new control devices and/or field devices due to changes in network topology may require the reconfiguration of existing control devices.

Other systems may include one or more control devices associated with respective substations. Such control devices generally must be pre-configured to be aware of one another so that data could be exchanged there between. Changes in previously deployed controller configurations are required every time a new controller is added. In addition, in instances such as fault isolation and restoration processes, changes that result in a change in power system topologies and power flow direction may cause affected controllers to be prevented from responding to additional topology changes.

BRIEF DESCRIPTION OF THE INVENTION

According to one aspect of the invention, a system for controlling a multi-feed power distribution network, the network including a first network sector that includes a first plurality of devices connected to a first power source and at least one second network sector that includes a second plurality of devices connected to a second power source, includes: a first controller configured to control operation of the first network sector and including first configuration data representing a first network sector topology, the first controller configured to, in response to a topology change in the first network sector causing a change in a location from which power is supplied to at least one affected network segment, transmit a message identifying the at least one affected network segment from the first controller to the network without prior knowledge of any other controllers; at least one second controller configured to control operation of the at least one second network sector and including second configuration data representing a second network sector topology, the second controller configured to receive the message without prior knowledge of any other controllers, exchange configuration information regarding the at least one affected segment with the first controller, and automatically update the second configuration data of the second controller based on the configuration information received from the first controller to reflect the topology change.

According to another aspect of the invention, a method of controlling a multi-feed power distribution network including a plurality of devices, the network including a first network sector that includes a first plurality of devices connected to a first power source and at least one second network sector that includes a second plurality of devices connected to a second power source, includes: in response to a topology change in the first network sector controlled by a first controller including first configuration data representing a first network sector topology, the topology change causing a change in a location from which power is supplied to at least one affected network segment, transmitting a message identifying the at least one affected network segment from the first controller to the network without prior knowledge of any other controllers; receiving the message by at least one other controller configured to control the at least one second network sector, without prior knowledge of any other controllers, the at least one other controller including second configuration data representing a second network sector topology; exchanging configuration information regarding the at least one affected segment between the first controller and the at least one other controller; and automatically updating the second configuration data of the at least one other controller based on the configuration information received from the first controller to reflect the topology change.

These and other advantages and features will become more apparent from the following description taken in conjunction with the drawings.

BRIEF DESCRIPTION OF THE DRAWINGS

The following description of the figures is not intended to be, and should not be interpreted to be, limiting in any way.

FIG. 3 is a flow diagram illustrating an embodiment of a method of controlling a multi-feed power distribution network.

DETAILED DESCRIPTION OF THE INVENTION

Figure 1:
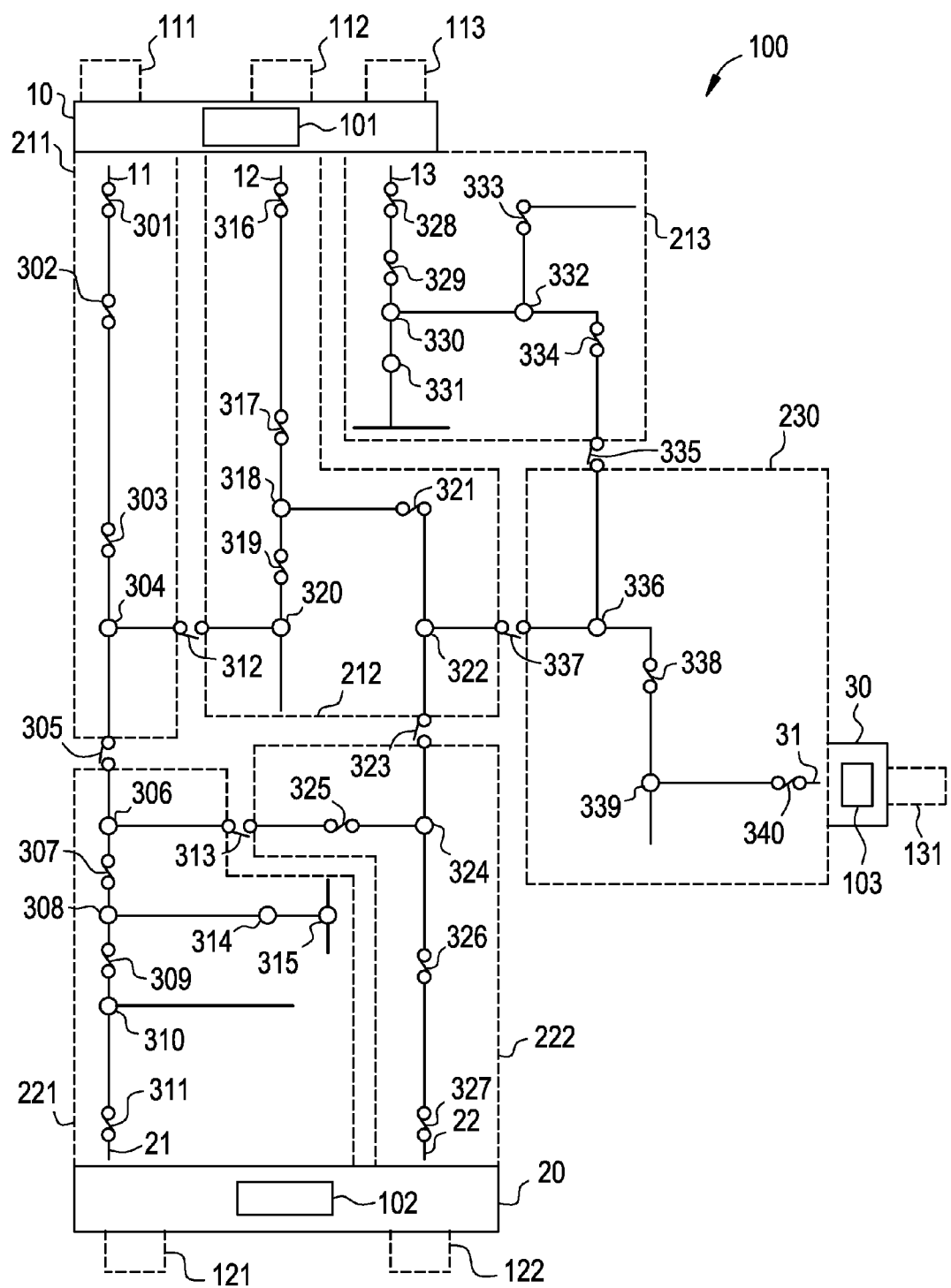
FIG. 1 is an illustration of an electrical power distribution network in a pre-fault state and its associated devices.

Various embodiments of systems and methods for describing and controlling power distribution networks are described herein. The systems include logic controllers, each overseeing a plurality of devices and capable of data exchange between controllers, and multiple feed power network topologies. The systems and methods perform various functions, including automatic self-discovery or identification of controllers and automatic discovery of network configuration changes. Such identification allows controllers to continue to operate after one or more topology changes deviating from an initial topology layout. In one embodiment, the controllers are each associated with a respective network sector having a topology including one or more nodes or segments operably connected to at least one power source. In one embodiment, at least one controller is configured to establish ad-hoc automatic communication with one or more other controllers in response to a change in the at least one controller's network sector topology so that the at least one controller and affected other controllers can automatically learn or update their respective configurations to reflect changes in their respective sector topologies. Such updates in the respective configurations, in one embodiment, result in configurations that would be the same as if a human operator manually configured the controllers to reflect the changed topology. The controllers may reside in, control and/or otherwise be associated with one or more power distribution substations.

In one embodiment, the controllers are configured to periodically or continuously monitor their respective sectors by observing field equipment status and configuration, to detect changes in their respective topologies. In one embodiment, the controllers are configured to monitor their respective topologies after a topology change to detect additional changes and/or restore their respective sectors to a previous topology. In the case of restoration of a network sector to an initial or previous topology, the respective controller may be configured to restore its configuration to reflect initial or previous topologies.

The systems and methods described herein allow for automatic self-discovery of controllers within a network, as well as automatic controller configuration changes in response to power network topology changes. The systems and methods further allow automation functions in the controllers to continue operating after one or multiple topology changes from an initial configured layout. The systems and methods may also allow the controllers to automatically restore their respective configurations to previous configurations as the network topology is restored to a previous topology or as an operator requires.

Various embodiments of a control application, such as computer programs, are described which may be provided as modules in existing network control applications. Embodiments of the control application may also reside in modules located within distribution network control and management systems and servers. When equipped with the control application, and any suitable communication protocols and interfaces for interaction with field devices, the control application may provide full distribution automation (DA) without the need for dedicated master controllers, and allow for changes in the network topology and/or expansion of the distribution network control without the need for extensive and potentially labor intensive changes to controller configurations or software.

With initial reference to FIG. 1, an exemplary power distribution network is generally indicated at 100. The power distribution network 100 includes a plurality of substations 10, 20 and 30, each of which is associated with one or more feeders, shown as 11, 12, 13, 21, 22 and 31. An example of a substation includes a distribution substation configured to transfer power from one or more transmission systems (e.g., a high-voltage transmission line or network) to one or more sectors of the network 100. Each substation 10, 20 and 30 includes one or more power sources or feeders 11, 12, 13, 21, 22 and 31. Each substation 10, 20, 30 may also include one or more circuit breakers, i.e. substation circuit breakers (or simply "breakers"), 301, 311, 316, 327, 328 and 340, each of which is connected to one of feeders 11, 12, 13, 21, 22 and 31. For the benefit of this text, substation breakers may also be described as "roots". As used herein, the term "feeder" refers to a power distribution line or other conductor that provides power to one or more portions of the network 100. In the present exemplary embodiment shown in FIG. 1, substation 10 is associated with feeders 11, 12 and 13, each of which are connected to breakers 301, 316 and 328 respectively. Substation 20 is associated with feeders 21 and 22, each of which are connected to breakers 311 and 327 respectively. Substation 30 is associated with feeder 31, which is connected to breaker 340. Although only three substations are depicted in this example, the network 100 may include any number of substations, each of which may include any number of feeders.

In one embodiment, the power distribution network 100 is part of a hierarchical transmission and distribution network. A transmission network is located at a high level hierarchy and supplies power to the distribution network 100. Substations 10, 20, 30 are located at a mid level hierarchy and are connected to a plurality of field devices located at a low level hierarchy of the transmission and distribution network. In one embodiment, the controllers are located at a hierarchy level that is at least the level of the substations, i.e., the mid level hierarchy, which is higher than lower hierarchy levels including "in field" locations.

Network 100 includes a plurality of nodes 301-340 located for example at a low level hierarchy, each of which affect the topology of network 100 and connect portions of one or more feeders. The term "node" relates to any addressable point on network 100. Nodes 301-340 may include any type of field device such as a circuit split, a sensor or other measurement point, and a controllable switch such as a circuit breaker or recloser. In one embodiment, the nodes include "non-intelligent" field devices, such as devices that do not include local controllers. The field devices may be field-installed devices, for example. The controllable switches may be either normally closed or normally open. Nodes 301-340 may be characterized as active or passive. "Active nodes" relate to any nodes that can be controlled to affect a topology change. Active nodes include reclosers, circuit breakers and controllable switches (including, for example, remote-controllable switches) which do not need to have any automation functions related to sectionalizing and restoration. Active nodes may be capable of three-phase or individual phase control. "Passive nodes" relate to nodes including network splits or any non-controllable items, and do not cause a topology change. Passive nodes may be accounted for because of consideration of load capacities due to re-routing possibilities within the network sector. Nodes may also define various branches, in which the circuit formed in the network splits into multiple additional circuits. A branch may occur as a single or multiple phase branch. The node where the split occurs, located toward the associated substation breaker, may be described as a "branch root".

Network 100 defines an associated "layout" or "topology", which refers to the distribution of the connections of the network, including static and geographical distributions, as well as the number, type and distribution of nodes in the network 100. Network 100 may also be divided into one or more "segments", which refer to single nodes, groups of connected nodes and/or portions of the feeder located between significant active or passive network nodes. Depending on the layout, segments may be capable of accepting power from multiple feeders across multiple substations. Each segment may have an associated configured "load capacity", which represents the maximum load that can be handled by the segment.

Referring again to FIG. 1, in the present exemplary embodiment, nodes 301-340 include passive network nodes, normally closed switches, normally open switches, and sensors. There is no pre-configured limit to the number of nodes. Nodes 302, 303, 307, 309, 317, 319, 321, 325, 326, 329, 333, 334 and 338 are normally closed switches, which may be opened, for example, to isolate a faulted segment. Nodes 305, 312, 313, 323, 335 and 337 are normally opened switches, which act to prevent cross power transmission and define the sectors of network 100. Nodes 304, 306, 308, 310, 315, 318, 320, 322, 324, 330, 332, 336 and 339 are passive network nodes, and nodes 314 and 331 are sensors. The layout of network 100, and the particular configuration of types and numbers of nodes shown in the present embodiment are merely exemplary. The system and methods described herein are applicable to any power distribution network having any desired topology, and any number, type and configuration of nodes.

Network 100 also includes a plurality of sectors, each of which may be fed by an individual feeder, and each of which has an associated layout or topology. The term "sector" relates to a distribution sub-network associated with a finite number of active nodes, such as breakers, switches and reclosers. Sectors may also be referred to as "power areas". The topology of a sector refers to the numbers, types and relative positions of nodes connected to or in communication with a controller and/or the controller's power supply. Each sector may be associated with an individual feeder or with multiple feeders. In one embodiment, each sector includes all of the segments between a single breaker in a substation connected to a single feeder and all normally open switches. The "edge" of a sector refers to the breakers in a substation and the normally open switches. In the present example shown in FIG. 1, network 100 includes six sectors 211, 212, 213, 221, 222 and 230, each associated with an individual feeder and bounded by a substation breaker and at least one normally open switch. Nodes, such as normally open switches, that define the edge of a sector and connect adjacent sectors may be referred to as "edge nodes".

In the present example, shown in FIG. 1, all segments are three-phase, i.e., there are no single-phase circuits. However, the control application and method described herein is capable of single-phase processing, and thus can be applied to non-three-phase networks such as single-phase networks.

The position of various nodes, substations, or other components in network 100 are described in relation to one another, and may be described in relation to their position on a network path in relation to other nodes, breakers, feeders or substations. For example, a first node described as being "before" or "previous" to a second node, "preceding" the second node or "upstream" from the second node, indicates that the first node is located before the second node when parsing the circuit path from the breaker toward an edge of the sector, i.e., is located between the breaker or substation and the second node. Likewise, a first node described as being "the next node", "after" or "following" a second node, or "downstream" from the second node, indicates that the first node follows the second node when parsing the circuit path from the breaker toward an edge of the sector, i.e., is located between the second node and a sector edge node.

Each substation 10, 20 and 30 includes a respective controller 101, 102 and 103, located at, for example, a mid level hierarchy, to control various network nodes. As shown in FIG. 1, controller 101 is included in substation 10, controller 102 is included in substation 20, and controller 103 is included in substation 30. In one embodiment, each controller 101, 102 and 103 is a Distribution Automation (DA) controller. In the present embodiment, each substation includes one controller. However, a substation may include more than one controller if desired. Each controller 101, 102 and 103 may also serve as a Supervisor Control and Data Acquisition (SCADA) remote terminal unit (RTU) as needed. Each controller 101, 102 and 103 communicates in a pre-configured and, in one embodiment, not dynamically changeable, client-server (master-slave) relationship with the active nodes and sensors located on power segments energized from a respective substation. Each controller 101, 102 and 103 is capable of automatically discovering the other controllers, without pre-configured settings, and establishing ad-hoc exchanges of data. In one embodiment, communication between controllers and nodes is accomplished by way of IP based services.

Each controller 101, 102 and 103 controls at least one sector connected to a feeder or other power source. In one embodiment, a sector is defined by its respective feeder and/or breaker and may further be defined by one or more respective open switches. In the example shown in FIG. 1, network 100 is divided into sectors 211, 212, 213, 221, 222 and 230. Sector 211 has edges defined by breaker 301 and normally open switches 305 and 312, sector 212 has edges defined by breaker 316 and normally open switches 312, 323 and 337, and sector 213 has edges defined by breaker 328 and normally open switch 335. Sectors 211, 212 and 213 are controlled by controller 101. Sector 221 has edges defined by breaker 311 and normally open switches 305 and 313, and sector 222 has edges defined by breaker 327 and normally open switches 313 and 323. Sectors 221 and 222 are controlled by controller 102. Sector 230 has edges defined by breaker 340 and normally open switches 335 and 337, and is controlled by controller 103. In one embodiment, all active nodes in each sector are pre-configured to transmit data to, and receive commands from, only the sector's respective controller, and dynamic re-configuration of such communication sessions may not be possible (e.g.: due to re-orientation of radio paths).

In one embodiment, if a given substation does not include a controller, controllers in other substations may be configured to interface the sectors normally covered by the given substation, thus building "logical" controllers. This configuration may result in a fully separate instance of the control application. Multiple sectors associated with the same substation may be controlled by the same physical controller, although from the perspective of the control application the physical controller may appear as different logical controllers.

Normally open switches may send data to and accept commands from controllers on either side of the normally open switch (in the case of multiple feeders in the same substation, these may include "logical" controllers). If this is not possible due to communication protocol or radio paths limitations in the normally open switch device, then one designated controller may be exclusively in charge of that active node, by marking this in the control application configuration.

The controllers and associated control applications and methods are described further herein. As an example, the features of the controller will be described in conjunction with controller 101. However, the features are also applicable to controllers 102 and 103, as well as any other controllers applied to any other substations and/or networks.

Controller 101 receives data from, and transmits data and/or commands to active nodes in sectors 211, 212 and 213.

Controller 101 can establish ad-hoc communication sessions with the other controllers, e.g., controllers 102 and 103—using an automated discovery mechanism. In one embodiment, there is no pre-configuration required for data exchanges between controllers.

A control application is provided, that may reside in one or more controllers and be executed by one or more controllers to initiate a process for controlling the topology of network 100. The control application may reside in one or more controllers, and is executed to perform one or more of the methods described herein, including affecting communication between controllers, sending topology information and configuring the controllers to reflect configured and/or changed topologies.

In one embodiment, each sector is recognized by the control application as a controller instance. Furthermore, in those substations having multiple feeders, and thus multiple sectors, the control application may represent the controller in that substation as multiple "logical" controller instances. Data is then exchanged between controller instances as needed. As used herein, "controller instance" includes a physical or logical controller recognized by the control application. Multiple controllers (or controller instances) may communicate among each other using ad-hoc auto discovered sessions and exchange data about the status of their own network sector.

In the example shown in FIG. 1, controller 101 may be represented as controller instances 111, 112 and 113, which control sectors 211, 212 and 213, respectively. Controller 102 may be represented as controller instances 121 and 122, which control sectors 221 and 222, respectively. Controller 103 may be represented as controller instance 131, which controls sector 31. Accordingly, "controllers" such as controllers 101, 102, 103 as described herein may, in some embodiments, also include any number of controller instances such as controller instances 111, 112, 113, 121, 122, 131. Where high availability is necessary, applicable controllers may be deployed in redundant configurations.

In one embodiment, the control application generates and/or includes configuration data describing the network layout or topology. In one embodiment, the configuration data describes the configuration of the network as simple individual segments and nodes. As referred to herein, a controller configuration may refer to the configuration data associated with the controller that describes a topology, pre-configured or otherwise, of the sector. The controller's configuration may include data identifying nodes and/or segments, describing the relative positions of nodes and/or segments within the sector and/or describing the status of the nodes and/or segments within the respective sector. This configuration data may be converted by the control application (or a configuration tool therein) into dynamically sized, multi-dimensional arrays that store the configuration information. In one embodiment, the control application describes the network layout or topology by storing configuration data as array elements corresponding to each node and segment in the network. This may be performed sequentially for each sector in the network. Each node and sector are thus described in the array as configured array data, and various characteristics or properties of each node and sector are described in the associated array element.

The control application may also record real time data from field devices (e.g. active nodes) and build sets of arrays as placeholders. This data may be referred to as "run time array data". By parsing the run time array data in reference to the configured array data, the control application can determine appropriate routing methods for power to the grid's segments (single or multiple phase). When grid limits are reached, i.e., the control application has described the configuration and run time data for all nodes associated with the respective sector, the control application will inform adjacent applications running in other controllers, so that the entire network grid is described in the array in an expandable form.

In one embodiment, a configuration data array in a controller instance includes data elements describing a network sector associated with the controller instance and the respective feeder, and each node in an order beginning at the breaker ("root") and ending at the edge nodes of the sector, until all normally open switches are reached for that feeder (all "edges").

Using the above approach, any type of network and/or sector layout or topology may be accurately described in very simple terms. Also, the layout of each sector may be described in identical code among all controller instances.

In one embodiment, the control application may use the configured array data to build data arrays as part of the controller's configuration (i.e., configuration data) describing the characteristics of each network component. Such arrays allow for a limitless number of interconnecting ties, segments, feeders or substations. Description of the configuration of a network can be achieved by simple description of the network sector topologies associated with each controller instance. Each controller instance does not need to know the configuration of other sectors.

In one embodiment, normally open switches (i.e., edge nodes) are configured with the same name in adjacent controller instances, so that when referenced by name, either controller instance will address each normally open switch correctly. This common naming convention allows for each controller to easily and accurately identify the normally open switches referenced in requests among the controllers.

In one embodiment, each of the controllers includes a respective data array. A controller's data array or other stored description of the topology of its respective sector, may be referred to as part of a "controller configuration". "Configuration information" refers to data stored with the controller, and may include all or part of the controller's data array. Configuration information includes data describing the stored and/or detected topology of a controller's respective sector. In one embodiment, the configuration information is stored with the controller in the form of a data array, which includes a unique identifier of each node in the sector controlled by the controller.

Dynamic changes in sectors' topologies (configurations) belonging to one controller instance will require updating of the configurations in other controller instances, so that automation functions continue to operate as configured for the initial sector topology.

In one embodiment, the controllers will establish ad-hoc communications with one another, based on auto discovery methods, to share array elements part of the configuration information, such as the topology of at least a portion of their respective sectors and/or configuration data related to one or more nodes within the controller's sector.

In one embodiment, a trigger controller is a controller instance that has been affected by a change in the power network topology. Changes in network topology include any condition that has caused power to flow to a segment or node from a feeder associated with a network sector not previously associated with the segment or node. In this instance, this affected segment or node is receiving power from a feeder associated with a new network sector, and thus the affected segment or node is now associated with a new network sector. Examples of such changes, referred to as "triggers", include the addition of new network controllers, nodes or segments, a commanded change of state, a change in status of any nodes resulting in new normally open ties, and sectionalization and reconfiguration processes resulting from a network fault.

In one embodiment, a trigger controller dynamically issues a broadcast message to all other controllers, to inform them of a change in the trigger controller's respective topology. The broadcast is not limited to the form of a broadcast as understood in internet protocol networks. The broadcast message allows for self-discovery prompting an ad-hoc response from other controllers without requiring prior mutual knowledge.

In one embodiment, the broadcast message includes an identification of one or more affected segments or nodes of the trigger network sector, which include one or more nodes whose connection with the power source has been lost or otherwise dropped. The affected sector may also include new normally open ties such as ties that were normally closed in the previous topology but whose state has been changed to normally open in the current topology. Such affected segments may be disconnected from all power sources as a result of the topology change, or may be connected with a new sector/power source due to the topology change.

Identification of the affected segments may include a unique identifier of each affected segment, for example, an identifier associated with a configuration data array such as the array described above. The identifier may uniquely identify nodes whose power supply has been lost or changed and/or nodes whose status has been changed to that of a normally open tie as a result of the topology change.

In one embodiment, the broadcast message includes a copy of at least a portion of the trigger controller instance's stored data array containing only changed array elements, that describes one or more affected nodes or segments in the controller's sector. In one embodiment, the broadcast message includes an indication of a change in the trigger controller's sector and/or data (such as a unique identifier) describing one or more nodes that have been affected by the sector change.

All other controllers (and their instances) in the network will accept the broadcast message from the trigger controller instance, and determine whether the identified affected segment (in the form of, for example the changed array element referenced by the unique identifier) is under its control and connected to its associated power source. In one embodiment, in response to the broadcast message, and if an identified affected segment is under the control of or otherwise associated with another controller instance (referred to herein as an "affected controller"), the affected controller and the trigger controller will establish an ad-hoc unicast or other point-to-point communication session therebetween based on the broadcast message source parameters (address). Configuration information may then be exchanged between the trigger controller and one or more affected controllers via the ad-hoc communication sessions. For example, the trigger controller sends configuration data (array elements) relating to affected segments to the affected controller(s).

In one embodiment, the communication session is established by each controller without any knowledge of other controllers in the system prior to the topology change. Multiple communication sessions can be established to enable communication between the trigger controller and multiple affected controllers.

Each controller may use the trigger configuration information to confirm and/or identify the nodes located within the controller's respective sector as a result of the topology change. For example, a controller can identify nodes and network segments that are under its own control or connected to its respective feeder, but not previously configured in its own data array or other configuration data. Likewise, the trigger controller can identify nodes and network segments that are no longer under its control, but were previously configured in its own data array. The controllers can thus update their own configuration data to reflect the current topology or topologies of their respective sectors automatically based on configuration data sent from one or more trigger controllers.

The configuration information used to update the other affected controller's configuration may be configuration data sent in the broadcast message and/or the established ad-hoc communication session in form of array elements. For example, identification information in the form of a unique identifier is sent with the broadcast message to allow the other controllers to determine whether any of the affected segments are within their sector, and additional trigger controller configuration data is sent via the ad-hoc unicast or other communication session to allow the affected controller to update it's configuration data (array elements). Examples of additional configuration data include node type, relative position in relation to other nodes and segments and other information found in the trigger controller's configuration data.

In one example, in response to a change in topology of the network, an affected or trigger controller sends a broadcast message including an identification of affected segments to other controllers in the network. For example, a newly added controller is deployed in a substation and configured to control a segment of the network and configured to control a "newly added sector". The newly added sector may include new network segments and/or network segments previously under the control of one or more other controllers. The newly added controller may send a broadcast message including its configuration information, such as the addresses of its normally open ties. The other pre-present controllers receive the message and compare their respective configurations to the newly added configuration to determine whether the configuration of their respective sectors has changed. In this way, all controllers (and their instances) can automatically configure themselves without the need for any pre-configuration procedures or user intervention.

There is no single master controller in the systems and methods described herein. In the case of simultaneous faults or other conditions that affect multiple sectors, there may be multiple controllers acting as "trigger controllers".

The exchange of information between controllers occurs ad-hoc ("on the fly") and without previous knowledge of each other. Controllers need only have initial knowledge of their own sectors and need not have global knowledge, i.e., knowledge of other network sectors.

Figure 2:
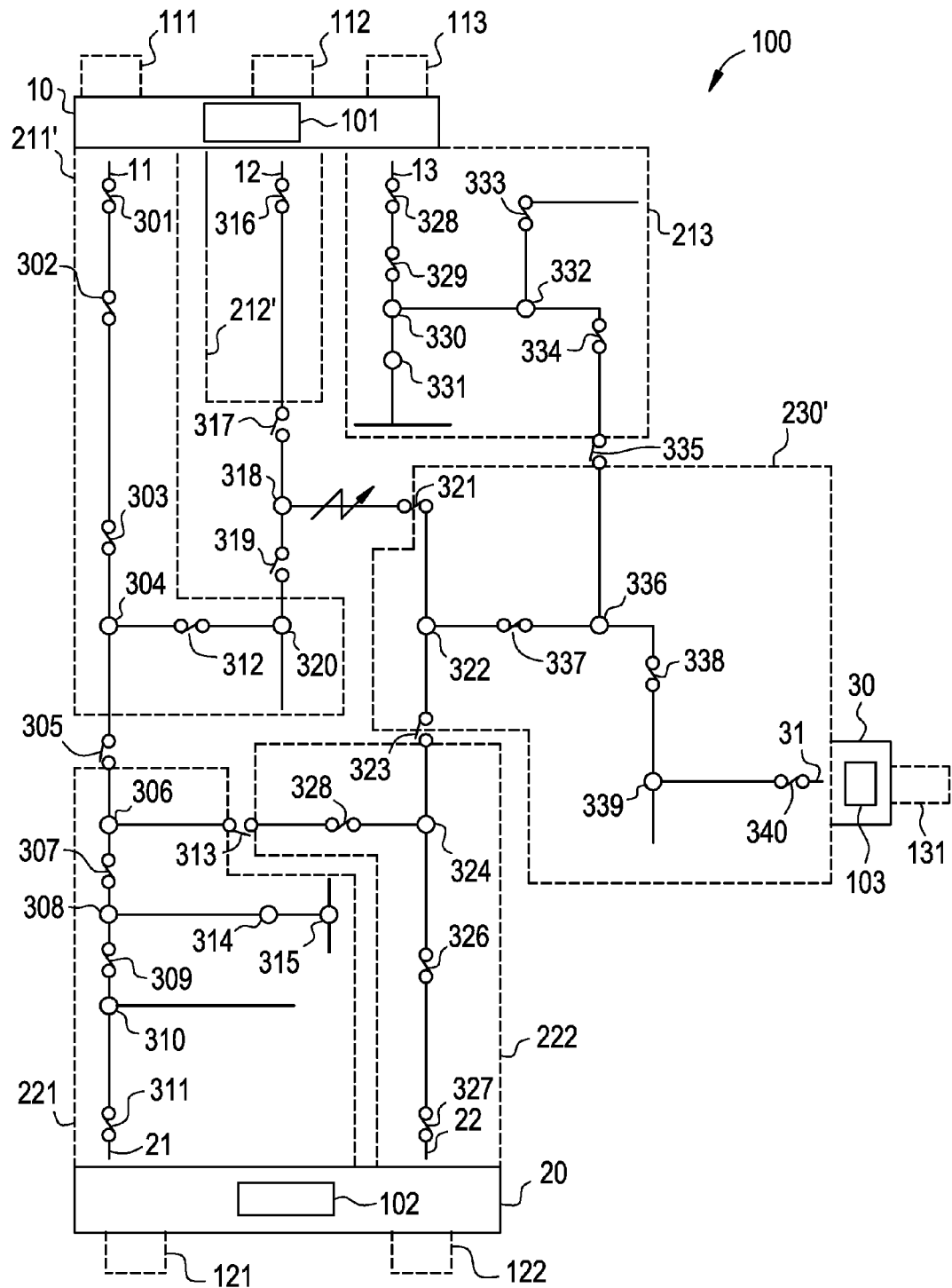
FIG. 2 is an illustration of the electrical power distribution network of FIG. 1 after a network topology change and its associated devices.

FIG. 2 illustrates an instance in which a power network topology is changed. The example shown in FIG. 2 illustrates a change in network topology due to a fault detection and restoration operation. However, the topology change may result from any number of reasons, such as an operator-controlled change, or an addition or subtraction of one or more network devices, controllers or sectors.

In the case of a fault in a given segment, the trigger controller is at least one controller instance that controls at least a portion of the faulted sector, i.e., the sector that includes the faulted segment. The trigger controller may isolate the fault, then look for possibilities of restoring the power from the same substation, or from other substations, by inquiring as to the power availability and circuit capacity restrictions of the remaining controller instances, via the broadcast and ad-hoc combination of self discovered communication sessions. The other controllers become an active part of the control application process after receiving requests from the trigger controller.

With reference to FIG. 2, if a fault occurs in sector 211, for example, between nodes 318 and 321, the resulting power network topology may be the topology shown in FIG. 2, wherein ties 317, 319 and 321 are open (to isolate the fault), tie 337 is closed and tie 323 remains open to provide power to the edge segments previously part of sector 212, but now part of an extended sector 230'. Tie 312 is closed to provide power to a now extended sector 211'.

FIG. 3 illustrates a method 400 of controlling a multi-feed power distribution network by configuring and/or re-configuring controller instances in a power network. The method 400 includes one or more stages 401-407. Although the method 400 is described in conjunction with the system 100, the method 400 may be used with any system capable of communication between network sectors as described herein. In one embodiment, the method 400 includes the execution of all of stages 401-407 in the order described. However, certain stages may be omitted, stages may be added, or the order of the stages changed.

In the first stage 401, a first controller detects a change in topology of a respective first network sector. In this example, the first controller is a trigger controller instance 112 that detects and isolates a fault between nodes 317, 319 and 321, shown in FIG. 2. The new network topology resulting from the fault is shown in FIG. 2. The trigger controller may refer to any controller that experiences a topology change (e.g., a change in the normally open tie), and is not limited to that described herein. In addition, the change in topology may occur due to any reason, which is not limited to a fault.

In this example, as a result of the topology change, the trigger controller 112 is now associated with a modified or affected network sector 212'. The affected nodes in this example are nodes 317-323 and 337. The controller 112, as a result of the topology change, is limited by node 317, which is now a normally open tie, and no longer has control over nodes 318-323 and 337. Other controller instances must now cover the remaining nodes delimited by 319,320,312, and 321,322,323,337.

In the second stage 402, the trigger controller instance 112 sends a broadcast message to all other controllers instances indicating that the network sector 212' has changed, specifying the unique identifiers of the previously configured normal open ties, now being out of reach. In one embodiment, the trigger controller 112 sends a broadcast message including the unique identifiers of the normal open ties 312, 337 and 323. The broadcast message may include various types of configuration data, such as data array elements with addresses, numbers, and settings.

Each controller instance 111, 113, 121, 122 and 131 receives the broadcast message and compares the received normal open ties' unique identifier configuration data to its respective sector normal open tie identifiers (edges) to determine whether its own respective sector includes one or more of the communicated normal open tie nodes, and the controller instance needs to become an "affected" controller instance. In the present example, the controller instance 111 detects that node 312 is now closed and linked to devices located past node 312, and the controller instance 111 becomes an affected controller instance. The controller instance 131 detects that node 337 is now closed and linked to devices located past 337, and 131 becomes an affected controller instance. The sector 211 topology in this example has changed and is referred to as affected sector 211', with an increased coverage. The sector 230 topology in this example has changed and is referred to as affected sector 230', with an increased coverage. The sector 212 topology in this example has changed and is referred to as affected sector 212', with a decreased coverage.

In the third stage 403, a unicast session or other communication exchange mechanism is established between the trigger controller and one or more affected controller instances, such as 111 and 131. In one embodiment, multiple unicast sessions may be established in parallel with different controller instances as required, to service multiple power sources. In the present example, controller instance 111 requests and establishes an ad-hoc unicast session with the broadcasting (trigger) controller instance 112 and sends an acknowledgement or other reply to controller instance 112 identifying node 312 as being part of its own configuration and requests the data defining the new topology, and controller instance 131 requests and establishes an ad-hoc unicast session with the broadcasting (trigger) controller instance 112 and sends an acknowledgement or other reply to controller instance 112 identifying node 337 as being part of its own configuration and requests the data defining the new topology.

In the fourth stage 404, using the established ad-hoc unicast sessions in 403, and based on the provided data identifiers received from the other controller instances, the trigger controller instance pushes or sends configuration data associated with network segments that are no longer part of its coverage or control or otherwise no longer associated with the trigger controller's sector, to the requesting affected controller instances. In this example, the trigger controller instance 112 sends to 111 configuration information data relating to nodes 319, 320 and segments in between—because the node 312 identifier has been received from controller instance 111. The trigger controller instance 112 sends to 131 configuration information data relating to nodes 321, 322, 323 and segments in between—because the node 337 identifier has been received from controller instance 131.

After receiving the configuration information data, the affected controllers dynamically ("on the fly") re-configure themselves such that their control reach will be extended, with the normal open tie(s) now in a different location. In this example, the controller instance 111 has a new normally open tie 319, and the controller instance 131 has two new normally open ties 321, 323. In this example, the affected controller 111 detects that switch 312 is closed and nodes 312, 320, 319 and segments in between are under its control. The affected controller 131 detects that switch 337 is closed and nodes 321, 322, 323, 337 and segments in between are under its control. The controller 111 updates its data arrays to include configuration data (e.g., array elements) sent from the trigger controller 112. The controller 111 now is configured to control a new sector 211'. The controller 131 updates its data arrays to include configuration data (e.g., array elements) sent from the trigger controller 112. The controller 131 now is configured to control a new sector 230'. The new resulting configuration can be treated no differently then an equivalent pre-built configuration, but was all a result of dynamic calculations and data exchanges, based on real time data. In one embodiment, the controller instances 111, 131 and the trigger controller 112 save their previous respective configurations, e.g., previously configured data arrays, for future use, to be able to restore their respective sector topologies to reflect a previous configuration in the instance that the network sectors are restored to the topology existing before the topology change, such as a base topology.

In one embodiment, affected nodes or segments now have a new controller, i.e., the affected controller. For example, the nodes 319 and 320 now have a new controller 111, and the nodes 321, 322 and 323 now have a new controller 131. In one embodiment, however, nodes 319, 320, 321, 322 and 323 will continue to operate via pre-configured communications protocols existing prior to the topology change, i.e. to the controller instance 112.

In the fifth stage 405, the trigger controller configures itself to route all real time data traffic associated with affected nodes to the affected controller instances, via the ad-hoc unicast communications sessions established in stage 403, in both directions, and all newly configured (affected) controller instances configure themselves to use the ad-hoc unicast communication sessions established in stage 403 to accept the routed real time data traffic coming from the trigger controller. As a result, all the real time databases of affected controller instances are up to date with affected node data, indirectly via the trigger controller and no differently then an equivalent pre-built configuration. In one embodiment, the controller instance 111 communicates indirectly with the new nodes 312 and 319 (320 is passive) via the trigger controller 112, which in turn communicates with the nodes 312 and 319 via pre-configured communications protocols, and the controller instance 131 communicates indirectly with the new nodes 321 and 323 (322 is passive) via the trigger controller 112, which in turn communicates with the nodes 321 and 323 via pre-configured communications protocols. In this way, pre-existing communication protocols between controllers and nodes in the network do not need to be modified to reflect the configuration changes.

For example, each controller instance 111, 131 and 112 includes dynamic data arrays reflecting the new configuration of their respective sectors 211', 230' and 212'. The trigger controller 112 still receives communications and/or signals from the nodes 319, 321, 323 based on the pre-configured protocols, and relays the signals to the affected controller instances 111, 131 based on its own data array. Likewise, communications from the affected controller instance 111 to the new node 319 are relayed through the trigger controller 112, and communications from the affected controller instance 131 to the new nodes 321, 323 are relayed through the trigger controller 112. This configuration eliminates the need for the affected controller instances to have any knowledge of individual devices in the original trigger sector; the affected controllers only need to use the newly learnt trigger controller 112 as a dynamically established proxy for real time data access to the affected nodes part of the original sector.

In the sixth stage 406, the entire system runs with the new self-created controller instances and trigger controllers acting as if they have been preconfigured with the sectors 211', 230' and 212' and will be capable of accepting future triggers (see action 401 to 406 in FIG. 3). The method 400 can be repeated for future triggers, causing the automatic creation of additional modified sectors, all without any user (e.g., human) required deployment of new configurations, and without any need of the controllers to have prior knowledge of each other. In one embodiment, the method 400 may be repeated until reaching a pre-determined number (threshold) of operations, or until available power flow paths are exhausted.

In the seventh stage 407, in the instance that power network topologies revert to the previous configurations (e.g., 211' reverts to 211, 230' reverts to 230 and/or 212' reverts to 212) due to, for example, operator initiated actions, the controllers 111, 131 and 112 may automatically revert back to their previous or base configurations, without requiring any user intervention. In one embodiment, the controllers can be equipped with pre-programmed automatic sequences, which will restore the power network topology to normal, upon a single initiated command across the network. For example, in the instance that the network sectors 211', 230' and 212' are reverted back to their previous topologies (i.e., configured as sectors 211, 230 and 212), each controller 111, 131 and 112 reconfigure their respective data arrays based on a configuration that was saved in memory prior to changing the data arrays to reflect the topology change. In one embodiment, by continuously monitoring the actual power network topology, the controllers are capable of automatically identifying changes in topology and/or identifying when a previous topology has been restored, and automatically reverting back to previous configuration settings. All ad-hoc unicast communication sessions may be closed after reverting to the initial states.

The network 100 may be in communication with one or more remote control centers. In such an embodiment, each controller may inform the remote control center of what is being performed at any moment. For example, each controller instance may use an appropriate number of analog encoded values ("pseudo points") to inform the remote control center of what is being performed. Each state and stage of the control application may have unique associated values updated in real time in these analog pseudo points. Furthermore, each controller instance may accept commands from the control center, such as "reset", "inhibit", "safety tag applied", "under maintenance" and others. In one embodiment, each controller instance may create events for important states, which may be relayed to the user and/or control center.

A number of advantages, and technical contributions accrue from the above-disclosed embodiments, some of which are discussed below. For example, a technical effect includes allowing for the dynamic, real-time configuration of mid level hierarchy controllers in a power network, without the need for manual or outside configuration, and without the need of field nodes controllers (the low level hierarchy in the power network) to be supplied from the same family, or required to have common sets of function, or any other prescriptive restriction. In the above-disclosed embodiments, the field nodes controllers can be of any type, function, family, vendor, communication protocol, with no imposed restrictions. Operation restrictions are reduced, as the methods and system allow the network to respond to multiple faults or other topology changes without the need for outside intervention.

In addition, the systems and methods provide the technical effect of allowing for mid level hierarchy controller re-configuration and operation of changed sector without the need to modify pre-existing communications protocols. There is no need to pre-configure multiple combinations of data channels or paths, as the system is configured to automatically learn how to route data based on learned real-time configurations. In addition, there is no need for complicated manual procedures to either restore or to confirm restoration of the power network topology back to normal. The systems and methods described herein do not require centralized distribution management systems (DMS), nor associated specific skilled personnel. The systems and methods are field device (low level hierarchy) and communication medium transparent, allowing for multi-vendor field equipment to co-exist together.

Additional advantages and technical effects include allowing for modular deployment of additional nodes, sectors and control units, allowing systems integrators to focus on the current and future needs, without concern for what has been already configured or commissioned, and allowing quick routing self learning and the use of standard IT (VLAN) technologies. Other advantages include savings associated with reduced need for field crew work (e.g., testing, commissioning, maintenance) and independency of communication protocols and mediums to field devices and their types.

While the methods and systems described above and/or claimed herein are described above with reference to an exemplary embodiment, it will be understood by those skilled in the art that various changes may be made and equivalence may be substituted for elements thereof without departing from the scope of the methods and systems described above and/or claimed herein. In addition, many modifications may be made to the teachings of above to adapt to a particular situation without departing from the scope thereof. Therefore, it is intended that the methods and systems described above and/or claimed herein not be limited to the embodiment disclosed for carrying out this invention, but that the invention includes all embodiments falling with the scope of the intended claims. Moreover, the use of the term's first, second, etc. does not denote any order of importance, but rather the term's first, second, etc. are used to distinguish one element from another.

The invention claimed is:

1. A system for controlling a multi-feed power distribution network, the network including a first network sector and at least one second network sector, the system comprising:
    a first controller configured to control operation of the first network sector of the multi-feed power distribution network, the first network sector including a first plurality of devices connected to a first power source, and the first controller including first configuration data representing a first network sector topology, the first controller configured to, in response to a topology change in the first network sector causing a change in a location from which power is supplied to at least one affected network segment, transmit a message identifying the at least one affected network segment from the first controller to the network without prior knowledge of any other controllers;
    at least one second controller configured to control operation of the at least one second network sector of the multi-feed power distribution network, the at least one second network sector including a second plurality of devices connected to a second power source, and the at least one second controller including second configuration data representing a second network sector topology, the second controller configured to receive the message without prior knowledge of any other controllers, exchange configuration information regarding the at least one affected segment with the first controller, and automatically update the second configuration data of the second controller based on the configuration information received from the first controller to reflect the topology change.

2. The system of claim 1, wherein each of the first controller and the at least one second controller are controller instances selected from at least one of a physical controller and a logical controller.

3. The system of claim 1, wherein the at least one second controller is a plurality of second controllers.

4. The system of claim 1, wherein the topology change is selected from at least one of: a change in a connection from at least one device between the first power source and the second power source, a fault in the network, an addition of at least one device to the network, and a subtraction of at least one device from the network.

5. The system of claim 3, wherein the first controller and the at least one second controller are configured to automatically discover and automatically configure themselves based on one or more broadcast messages sent from the first controller to the plurality of second controllers.

6. The system of claim 1, wherein exchanging configuration information includes establishing an ad-hoc automated and self discovered unicast session between the first controller and the at least one second controller and sending configuration data related to the affected segments from the first controller to the at least one second controller.

7. The system of claim 5, wherein exchanging configuration information includes establishing an ad-hoc automated and self discovered unicast session between the first controller and the at least one second controller and sending configuration data related to the affected segments from the first controller to the at least one second controller.

8. The system of claim 1, wherein the first controller and the at least one second controller are configured to revert the first and second configuration data to a base configuration in response to a restoration of the first and second network sector topologies to base topologies.

9. The system of claim 1, wherein the first configuration data includes a first data array for the first network topology, the first data array including a first plurality of array elements, each of the first plurality of array elements representing properties of one of the first plurality of devices, and configuration information includes at least one data array element describing the affected network segment.

10. The system of claim 1, wherein the second configuration data includes a second data array for the second network sector, the second data array including a second plurality of array elements, each of the second plurality of array elements representing properties of one of the second plurality of devices, and updating a configuration of the at least one second controller includes incorporating the at least one data array element in the second data array.

11. A method of controlling a multi-feed power distribution network including a plurality of devices, the network including a first network sector that includes a first plurality of devices connected to a first power source and at least one second network sector that includes a second plurality of devices connected to a second power source, the method comprising:
    in response to a topology change in the first network sector controlled by a first controller including first configuration data representing the first network sector topology, the topology change causing a change in a location from which power is supplied to at least one affected network segment, transmitting a message identifying the at least one affected network segment from the first controller to the network without prior knowledge of any other controllers;
    receiving the message by at least one other controller configured to control the at least one second network sector, without prior knowledge of any other controllers, the at least one other controller including second configuration data representing the second network sector topology;
    exchanging configuration information regarding the at least one affected segment between the first controller and the at least one other controller; and
    automatically updating the second configuration data of the at least one other controller based on the configuration information received from the first controller to reflect the topology change.

12. The method of claim 11, wherein the affected segment includes at least one device selected from at least one of: an active node, a passive node, a controllable switch, a recloser, a circuit breaker, a network split, and a sensor.

13. The method of claim 11, wherein the topology change is selected from at least one of: a change in a connection from at least one device between the first power source and the second power source, a fault in the network, an addition of at least one device to the network, and a subtraction of at least one device from the network.

14. The method of claim 11, wherein the at least one other controller includes a plurality of other controllers, and the message is a broadcast message sent from the first controller to each of the plurality of controllers.

15. The method of claim 11, wherein exchanging configuration information includes determining by the at least one other controller whether the at least one affected segment is included in the second network sector as a result of the topology change, and in response to the at least one affected segment being included in the second network sector, establishing an ad-hoc automated and self discovered unicast session between the first controller and the at least one other controller and sending configuration data related to the affected segments from the first controller to the at least one other controller.

16. The method of claim 14, wherein exchanging configuration information includes determining by the at least one other controller whether the at least one affected segment is included in the second network sector as a result of the topology change, and in response to the at least one affected segment being included in the second network sector, establishing an ad-hoc automated and self discovered unicast session between the first controller and the at least one other controller and sending configuration data related to the affected segments from the first controller to the at least one other controller.

17. The method of claim 11, wherein the first controller and the at least one other controller is configured to revert the first and second configuration data to a base configuration in response to a restoration of the first and second network sector topologies to base topologies.

18. The method of claim 11, wherein the first configuration data includes a first data array for the first network sector, the first data array including a first plurality of array elements, each of the first plurality of array elements representing properties of one of the first plurality of devices, and the configuration information includes at least one data array element describing the at least one affected network segment.

19. The method of claim 18, wherein the second configuration data includes at least one second data array for the second network sector, and updating a configuration of the other controller includes incorporating the at least one data array element in the at least one second data array.

20. The method of claim 19, further comprising:
saving, by the first controller, a copy of the first data array reflecting a first base topology of the first network sector prior to the topology change; and
saving, by the at least one other controller, a copy of the second data array reflecting a second base topology of the at least one second network sector prior to the topology change.

* * * * *